Oct. 5, 1926.

N. D. ELLER

GLASS JAR

Filed Nov. 17, 1924

1,602,346

WITNESSES

INVENTOR
Nathan D. Eller,
BY
ATTORNEYS

Patented Oct. 5, 1926.

1,602,346

UNITED STATES PATENT OFFICE.

NATHAN D. ELLER, OF LYNCHBURG, VIRGINIA, ASSIGNOR TO LYNCHBURG GLASS CORPORATION, OF LYNCHBURG, VIRGINIA, A CORPORATION OF VIRGINIA.

GLASS JAR.

Application filed November 17, 1924. Serial No. 750,441.

My present invention relates generally to preserve jars and has to do particularly with two well known types of molded glass jars, in one of which a metal top or cap screws upon the jar in connection with threads molded in the glass around the upstanding neck of the jar, and in the other of which a glass cap having a shallow peripheral flange is held on the jar by means of a wire bail or clamp, the jar having in this instance an inturned flange around its upper edge forming an annular seat for a gasket and for the flanged edge of the cap, and terminating in a short inner upstanding lip.

The two types of jars just mentioned, are both well known and in common every day use and manufacturers of both types of jars find themselves under the disadvantage of anticipating the proportionate demand therefor in the trade. As the trade demands fluctuate to a considerable extent, the manufacturers often find themselves overstocked in one type and short of the demand for the other type, and in addition to this disadvantage, the jar as above described providing for a flanged glass cap held by a bail or clamp, has the disadvantage of a much greater percentage of imperfect products than the other type, by reason of its inturned and inner flange.

In addition to its primary object of providing a jar adapted to either a metal threaded cap or a flanged glass cap and holding bail or clamp, my invention has for a further object the provision of a jar adaptable to both types of caps, which will be just as easy to manufacture as the usual jar made for the metal threaded cap, as well as a jar which will have no greater percentage of imperfect products or "seconds" than the usual jar made for the metal threaded cap.

With these objects in mind, the further objects as well as the resulting advantages of my invention will be made plain in the course of the following description, reference being had to the accompanying drawing which illustrates my invention and forms a part of this specification, and wherein—

Figure 1:
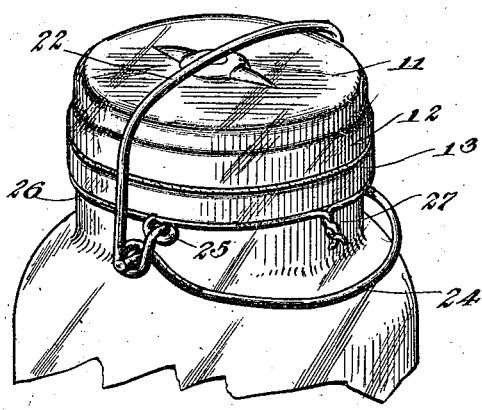
Figure 2:
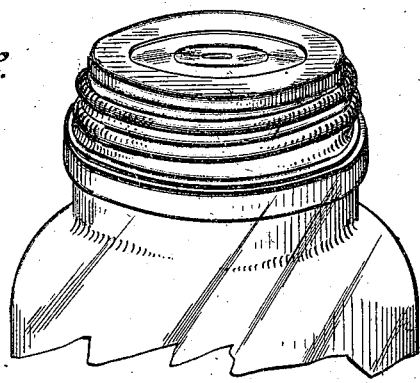
Figure 3:
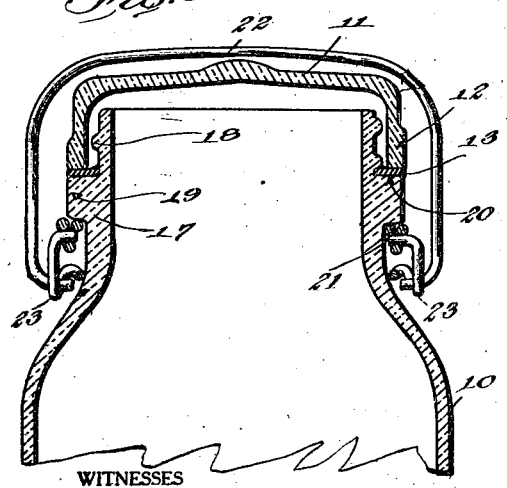
Figure 4:
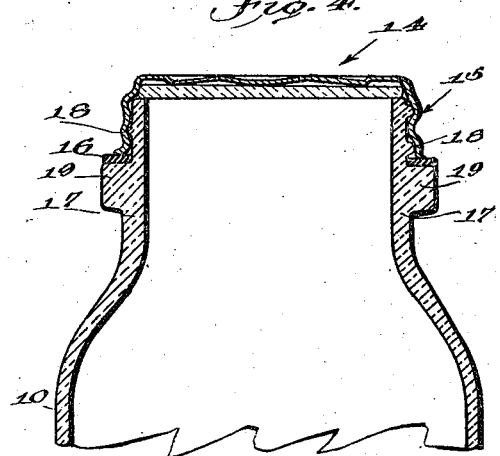

Figure 1 is a perspective view showing the complete jar with the flanged glass closure or cap and its holding bail or clamp in operative position, Figure 2 is a similar view showing the jar with the usual threaded metal cap applied thereto, and Figures 3 and 4 are vertical transverse sections respectively through the products shown in Figures 1 and 2.

Referring now to these figures my invention proposes a jar 10 adaptable to the interchangeable use of cap-like closures, one cap or closure being like the jar formed of glass with a peripheral flange, the cap and flange being respectively indicated at 11 and 12 and the seal in use being completed at the free edge of the flange 12 which in practice rests upon a flat rubber gasket 13. The other form of cap or closure indicated at 14, is constructed of metal, with its flange 15 threaded and the free edge of this cap seats in practice upon a gasket 16 similar to the gasket 13 just mentioned.

In order to provide for this interchangeable use of the different types of closures or caps mentioned, the jar 10 is provided with an upstanding neck 17 whose inner surface is of the same diameter throughout the length of the neck, the latter of which is somewhat reduced with respect to the diameter of the jar body. Adjacent to its upper end the neck 17 is formed with an externally threaded portion 18, with the threads of which the threaded flange 15 of the metal cap 14 are adapted to engage, the neck 17 also having below its threaded portion 18 an outstanding annular rib 19 which provides an upwardly facing annular shoulder 20 adapted to receive the flat rubber gaskets 13 and 16, and a downwardly facing annular shoulder 21 for a purpose which will be presently made plain.

It is obvious from the foregoing that by virtue of the substantial rib 19 and the upwardly facing shoulder 20 presented thereby, either the metal cap 14 may be screwed down upon the threaded portion 18 of the neck until the free edge of its flange 15 tightly engages the gasket 16 seated on the shoulder 20, or the glass cap 11 may be employed with its flange extending downwardly around the threaded portion without engaging with the threads and the free edge of its flange against the gasket 13 on the shoulder 20.

In order to clamp the glass cap 11 in place, a U-shaped clamping bail 22 is adapted to be extended across the same, the ends of this bail being inturned through the side eyes 23 of a U-shaped bail actuating lever 24, the inturned extremities of the latter of which extend into the side eyes 25 of a supporting wire 26 which is extended around the neck of the bottle with its ends twisted as at 27, against the lower shoulder 21 of the rib 19 which thus forms an anchor for the holding ring 26 as applied to the jar.

It is thus obvious that the invention serves a highly useful purpose in providing for the manufacture of all jars of a similar construction adapted for the interchangeable use of the two caps, many of the purchasing public being partial to the use of one cap as distinguished from the other. When the demand is for the glass tops, the top holding bail 22 and its parts may be readily applied to the jar, the latter of which provides in the manner indicated for the anchoring of the holding wire 26. The caps 11 are supplied with these jars and the product is then complete and ready for sale. On the other hand if the demand is for the jar with the metal threaded top, the caps 14 are simply screwed upon the threads of the neck and the product is complete and ready for sale.

Moreover my invention in no way complicates the construction of the usual jar provided for the metal threaded top and avoids the disadvantages incident to the many imperfect products or seconds in the manufacture of the usual jar providing for a flanged glass top and its advantages with respect to the interchangeability of tops will in use extend not only to the manufacturer but also to the purchasing public in general.

I claim:

1. In combination, a jar and interchangeable cap closures therefor, one of which has a threaded flange and the other of which has a plain flange of somewhat greater diameter than the threaded flange of the first cap, the jar having a neck portion of the same internal diameter throughout its length and being provided adjacent to its upper end with an externally threaded portion, the threads of which are adapted to cooperate with the threaded flange of the first mentioned cap, said jar being also provided with an annular outstanding rib around its said neck below the threaded portion, presenting an upwardly facing annular gasket receiving shoulder constituting a seal forming abutment for the free edges of the flanges of both said caps, said rib also presenting an annular downwardly facing shoulder, and connections for securing the second cap in position on the bottle neck including a holding ring around the neck anchored against the last mentioned shoulder of the rib, the flange of the last mentioned cap being adapted to clear the threads of the jar neck and to rest with its lower edge upon the upper surface of the said rib.

2. In combination, a jar and interchangeable cap closures therefor, one of which closures has a threaded flange and the other of which is provided with a plain flange of somewhat greater diameter than the first mentioned flange, and means including a clamping bail, bail actuating lever and lever supporting ring for securing the last mentioned cap in place on the jar, said jar having at the upper end of its neck an externally threaded portion and having below said threaded portion an annular outstanding rib presenting an upwardly facing annular gasket receiving shoulder and a lower downwardly facing annular shoulder the latter adapted to form an anchor for the said holding ring, the flange of the last mentioned cap being adapted to clear the threads of the jar neck and to rest with its lower edge upon the upper surface of the said rib as described.

NATHAN D. ELLER.